O. T. HENRIKSON.
HOOK, AUTOMATIC RELEASING.
APPLICATION FILED NOV. 20, 1915.
1,286,622.
Patented Dec. 3, 1918.
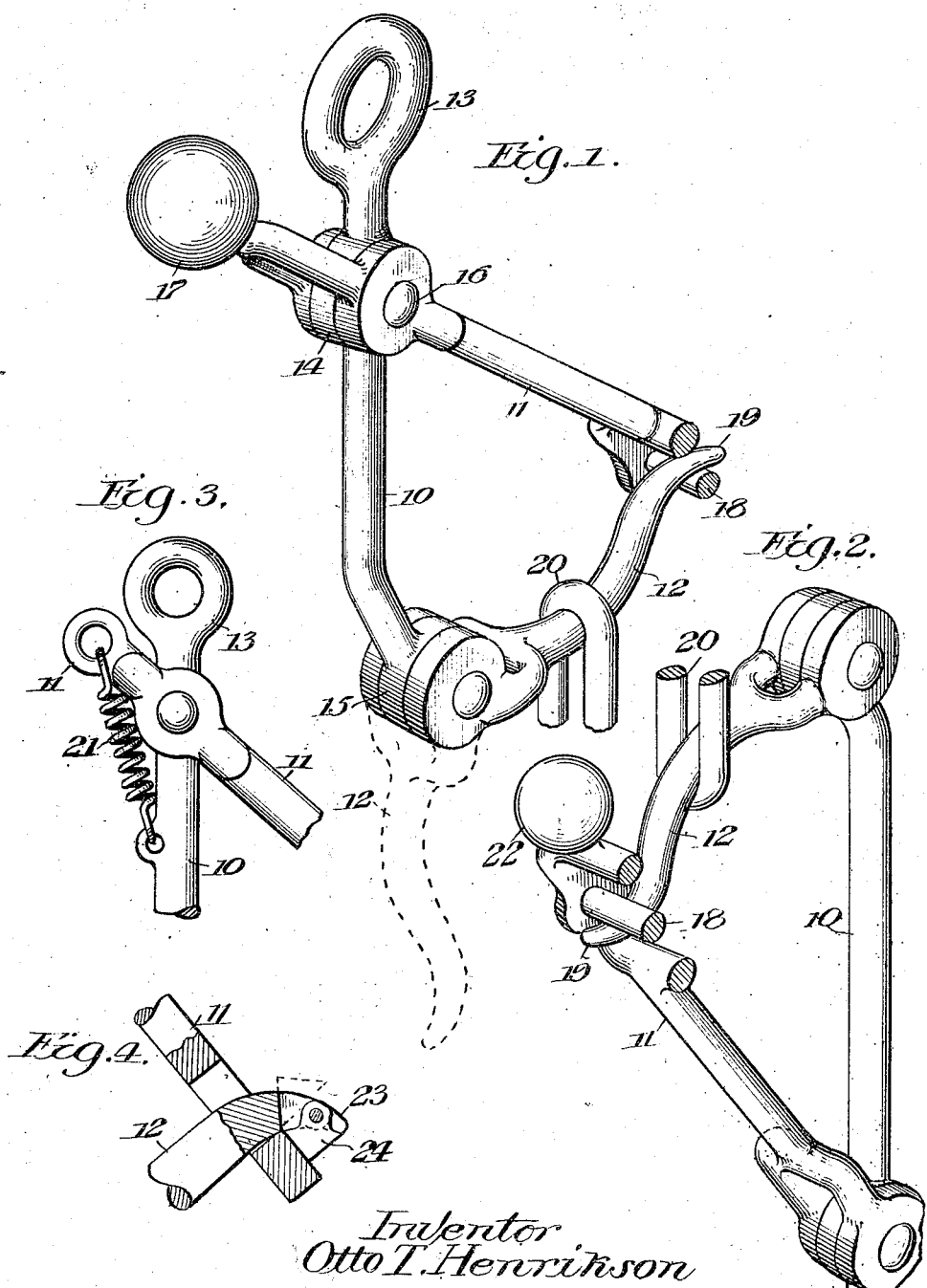
Inventor
Otto T. Henrikson
by Otto M. Wernich
Atty.

UNITED STATES PATENT OFFICE.

OTTO T. HENRIKSON, OF CHICAGO, ILLINOIS.

HOOK, AUTOMATIC RELEASING.

1,286,622.  Specification of Letters Patent.  Patented Dec. 3, 1918.

Application filed November 20, 1915. Serial No. 62,505.

*To all whom it may concern:*

Be it known that I, OTTO T. HENRIKSON, a citizen of the United States, residing at Chicago, in the county of Cook and State of Illinois, have invented a certain new and useful Improvement in Hooks, Automatic Releasing, of which the following is a full, clear, concise, and exact description, reference being had to the accompanying drawings, forming a part of this specification.

The invention relates to automatic hooks and primarily to that class of these devices which are automatic in their releasing action. The object of the invention is the production of a device of this character which will be simple in construction and operation, and which will not result in a corresponding reduction in efficiency.

The device herein shown and described is designed to be capable of securely holding an object while same is being lifted and transported from one position to another, and which will automatically release the object upon its being placed at its desired destination, thereby eliminating the necessity of the attention of a person at the place that the object is to be deposited.

I will explain the invention more in detail by reference to the drawings, in which—

Figure 1 is a perspective view of my improved hook;

Fig. 2 is a perspective view of a modification of the device shown in Fig. 1;

Fig. 3 is a side elevation of a portion of another modified form of construction, and Fig. 4 is a view showing a means whereby the device may be locked against separation when desired.

Referring to the drawings, and particularly to Fig. 1, I show a pair of toggle members 10 and 11 and a cross bar 12 coöperating therewith. The member 10 is provided at one of its extremities with the eyelet 13 which forms a convenient means whereby the device may be secured to a chain or cable (not shown), and suspended therefrom. This member 10 is further provided with the flattened apertured portions 14 and 15 which form convenient points of attachment for the members 11 and 12. The member 11 is pivotally secured at 14 to the member 10 by means of the bolt or pin 16, this member being provided at its opposite extremities with the counter weight 17 and the pin 18. This pin is designed to coöperate with the member 12 in a manner presently to be described.

The cross member 12 is pivotally secured to the member 10 at 15 and projects outwardly therefrom toward the pin 18 of the member 11 and engages said pin when the parts are placed in operative relation to each other. The end of the member 12 remote from its pivot is provided with the curved end portion 19 which forms a cam surface which with the coöperation of the pin 18 tends to move the lever 11 inwardly when a strain is exerted upon the member 12. It will be understood that the curve of this portion 19 is not so great as to interfere with the operation of the device in its proper manner. The member 12 forms a convenient means whereby a link or hook 20 of the article to be supported may be engaged and released when the article is desired to be lifted or deposited.

In the modified form shown in Fig. 3, a spring 21 is shown which re-acts between the end of the member 11 and the member 10, this being equivalent in its action to the counter weight 17.

In the form of device shown in Fig. 2, the construction is similar to that shown in Fig. 1, but differs therefrom in that the member 11 is provided with the weight 22 at the end nearest the end of the member 12 instead of remote therefrom as in the device shown in Fig. 1. This device also differs slightly in that the member 10 may form part of the device to be transported or released. It will be noted that this arrangement will be somewhat quicker in its releasing action, because the weight 22 will not have to overcome the weight of the chain of which the link 20 is a part, as is evident immediately upon the release of the pulling strain of the chain, the parts 18 and 19 will become disengaged from each other, due to the tendency of the member 11 to swing away from the member 12, thereby releasing the connection between the end 19 of said member and the pin 18 of the member 11.

It will be understood from the foregoing explanation of the construction of the device that as long as a pulling strain is exerted upon the several parts, same will maintain the relation to each other as shown in full lines in Figs. 1 and 2, and immediately upon the pulling action being eliminated, the pin 18 of the member 11 will be forced by the weight 17 or 22 from engagement with the end of the member 12, permitting the member 12 to swing away from the member 11. This position of the parts allows the link 20 to disengage itself or slide away from the member 12 and release the article to which the hook had previously been attached.

The construction shown in Fig. 4 illustrates a means whereby the parts 11 and 12 may be locked together to prevent the operation of the device as herein before mentioned. When this construction is desired the end of the member 12 will be slotted as shown at 23 and the wedge shape key 24 pivoted thereto, which when positioned as shown prevents the arm 11 from becoming disengaged from the cross arm 12. When the device is desired to be used in the ordinary way the key will be positioned as shown in dotted lines, which permits the parts to become disengaged from each other when the pulling strain is released from said member.

Having thus described several forms which my invention may take it is thought the nature of my invention will be readily clear, and what I claim as new and desire to secure by Letters Patent is:

1. In a device of the class described the combination of a pair of pivoted members, pivotally secured to another member, said pivots being arranged in substantial vertical alinement with each other, one of said pivoted members extending downwardly from its pivot to a position which is substantially in horizontal alinement with the pivot of the other member which forms a means whereby an object may be releasably secured thereto, the ends of said pivoted members remote from the pivots thereof being in engagement with each other, the end of the downwardly extending member being arranged to be passed over the end of the other pivoted member and to engage the under side thereof and having means whereby said pivoted members may be automatically disengaged from each other to release the object carried thereby.

2. In a device of the character described the combination of a pair of members pivotally secured one above the other in substantial vertical alinement to a connecting member, the ends of said pivoted members remote from their pivots being separably connected together, one of said pivoted members forming a means whereby an object may be releasably secured thereto, the other of said pivoted members being constructed to be passed over the end of the member to which the object is secured so as to engage the underside of said member, and to swing outwardly away from the member to which the object is secured when said object is to be released and means whereby said pivoted members may be automatically operated to release said object.

3. In a device of the class specified, the combination of a pair of pivoted members, pivotally secured to another member, automatic means for actuating one of said members to cause the same to swing outwardly and away from the other member, and pivoted means carried by the other pivoted member for locking said members to prevent the automatic operation thereof, said means being arranged to be interposed between the ends of said pivoted members.

4. In a device of the character described, the combination of a pair of members pivoted in substantial vertical alinement with each other to another member, one of said pivoted members extending downwardly from its pivot to a position which is substantially in horizontal alinement with the pivot of the other member which forms a means whereby an object may be releasably secured thereto, the ends of said pivoted members remote from the pivots thereof being in engagement with each other, the end of the downwardly extending member being arranged to be passed over the end of the other pivoted member to engage the under side thereof, and means arranged at one side of the pivots of the pivoted members whereby said pivoted members may be automatically disengaged from each other to release the object carried thereby.

In witness whereof I hereunto subscribe my name this 15th day of November, A. D. 1915.

OTTO T. HENRIKSON.

Witnesses:
 WM. OSHER,
 R. W. BERRY.

Copies of this patent may be obtained for five cents each, by addressing the "Commissioner of Patents, Washington, D. C."